Oct. 29, 1929.          D. A. MacGILLIVRAY          1,733,129
             BRUSH ADJUSTING DEVICE FOR GENERATORS
                       Filed April 20, 1923
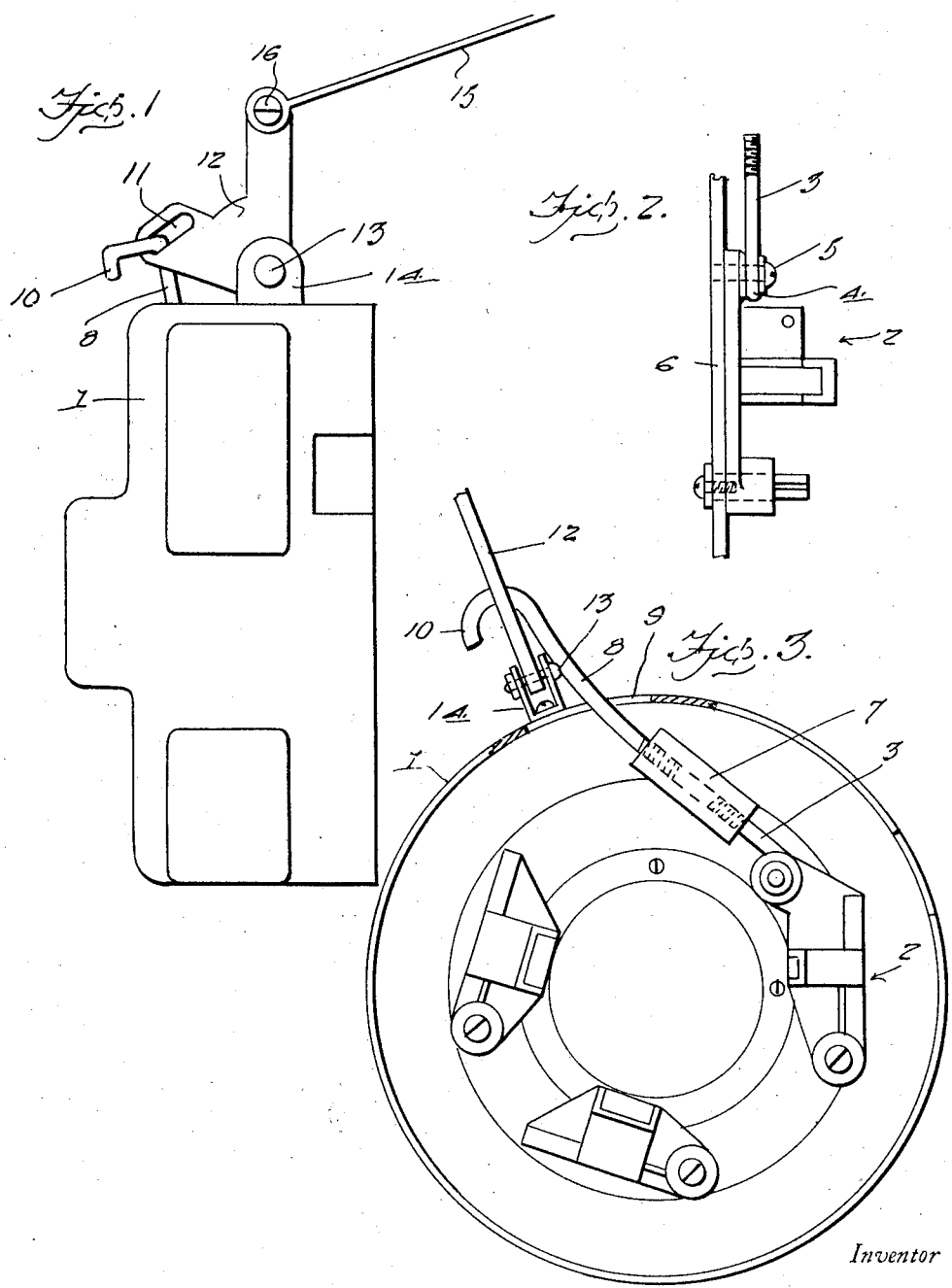
Inventor
D. A. Mac Gillivray
By Clarence A. O'Brien
                        Attorney Patented Oct. 29, 1929

1,733,129

UNITED STATES PATENT OFFICE

DONALD A. MacGILLIVRAY, OF DALKEITH, ONTARIO, CANADA

BRUSH-ADJUSTING DEVICE FOR GENERATORS

Application filed April 20, 1928. Serial No. 271,539.

The present invention relates to improvements in brush adjusting devices for generators of automobiles and has for its principal object to provide a simple and efficient means whereby the third brush of the generator may be adjusted from the dashboard of the automobile so that the driver of a vehicle may control the output of the generator and consequently the rate of charging of the battery in accordance with varying driving conditions.

It is a well known fact that automobile owners must necessarily recharge the batteries of their automobiles from time to time due to the fact that no readily accessible means is provided for adjusting the output of the charging generator. If the generator is set to properly charge the battery for long distance driving, then the output is insufficient to properly charge the battery during the use of the automobile around town where the starter is used very frequently.

On the other hand, the generator if set to properly charge the battery during the use of the car around town, then there is a danger of the battery overcharging on long distance driving.

It is therefore one of the principal aims of the present invention to provide a means for facilitating the proper adjustment of the third brush of the generator to keep the battery charged to the proper degree at all times thus tending to eliminate the necessity of having to constantly recharge the battery of the automobile.

A still further object is to provide a third brush adjusting device that can be readily and easily installed on an automobile without necessitating any material alterations of the parts with which said device is associated.

A further object is to provide a brush adjusting device of the above mentioned character which is simple in construction, inexpensive, strong and durable and further well adapted to the purposes for which it is designed.

Other objects and advantages will become apparent during the course of the following description.

In the accompanying drawing, forming a part of this specification, and in which like numerals indicate like parts throughout the same:

Figure 1 is a side elevation of the generator cap showing the adjusting device for the third brush mounted thereon, Figure 2 is a detail of the third brush unit, and Figure 3 is a view showing the operative connection between the bell crank lever and the third brush unit of the generator.

In the drawing wherein for the purpose of illustration is shown the preferred embodiment of my invention, the numeral 1 designates generally a dust cap of a generator that is used upon automobiles. The movable third brush that is associated with an automobile generator is shown generally at 2 with reference more particularly to Figure 3 of the drawing, and this unit is of the conventional construction and therefore a detailed description thereof is not thought necessary. The device for adjusting the third brush with respect to the cummutator of the generator comprises a rod 3 that is formed at its outer ends with an eye 4 through which extends a bolt 5 that is threaded into the base 6 of the third brush unit 2 at the free end thereof. The inner or free end of this rod 3 is threaded for engagement within one end of an insulated sleeve 7.

The adjusting device further includes the provision of an elongated rod 8 that is threaded at its inner end in the opposite end of the insulated sleeve 7 and the inner opposed ends of the rods 3 and 8 are spaced with respect to each other whereby to prevent a short circuit. The intermediate portion of the rod 8 extends upwardly through a slot in the usual generator cap dust ring not shown and through a slot 9 formed in the dust cap 1 and the outer end of this rod 8 is formed with a hook 10 that engages with a slot 11 formed in the outer end of one of the arms of a bell crank lever 12 that is pivoted as at 13 in a bracket 14 secured on the dust cap 1.

An operating rod 15 is operatively connected at its forward end to the outer end of the other arm of the bell crank lever 12 as at 16 and this rod 15 extends rearwardly and upwardly through the dashboard of the automobile not shown and a suitable handle or the like may be provided on the rear end of the operating rod for actuating the same.

By actuating the operating rod 15, the bell crank lever 12 is caused to rock on its pivot 13 whereby to move the third brush toward or away from the commutator and in this manner, the third brush may be adjusted by the operator of the vehicle from his seat. When the operating rod 15 is pushed forwardly, the adjustable brush unit 2 is operated to retard and when the rod 15 is pulled outwardly or rearwardly, the adjustable brush is advanced.

It will thus be seen from the foregoing description, that I have provided a third brush adjusting device that can be readily and easily installed on an automobile without necessitating any material alterations of the parts of the generator with which said device is associated and furthermore, the adjusting device will at all times be positive and efficient in its operation.

While I have shown the preferred embodiment of my invention, it is to be understood that various changes in the size, shape and arrangement of parts may be resorted to without departing from the spirit of the invention and the scope of the appended claim.

What I claim is:—

A device for use upon an automobile having a generator provided with a movable brush unit, comprising a rod formed at its outer end with an eye for attachment to the movable brush unit for actuating the same, an additional rod, the inner ends of the rods being threaded, an insulated sleeve, the adjacent ends of the rods being threaded into the respective ends of the sleeves and being spaced apart with respect to each other, a bell crank lever mounted for pivotal movement upon the cap of the generator, the outer end of the last mentioned rod being formed with a hook, the outer end of one of the arms of the bell crank lever being formed with a slot for cooperative connection with the hooks, and a remotely controlled operating rod connected to the outer ends of the other arm of the bell crank lever.

In testimony whereof I affix my signature.

DONALD A. MacGILLIVRAY.